United States Patent
Huang

(10) Patent No.: US 8,089,729 B2
(45) Date of Patent: Jan. 3, 2012

(54) SLIDER WITH AN AIR BEARING SURFACE AND RELATED TOPOGRAPHY

(75) Inventor: Weidong Huang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 707 days.

(21) Appl. No.: 12/250,597

(22) Filed: Oct. 14, 2008

(65) Prior Publication Data
US 2010/0091405 A1     Apr. 15, 2010

(51) Int. Cl.
*G11B 5/60* (2006.01)
(52) U.S. Cl. .................................. 360/235.8
(58) Field of Classification Search ........... 360/234.3, 360/236, 237
See application file for complete search history.

(56) References Cited

U.S. PATENT DOCUMENTS

| | | | |
|---|---|---|---|
| 6,055,127 A | 4/2000 | Boutaghou et al. | |
| 6,498,701 B1 | 12/2002 | Berg | |
| 6,594,113 B2 | 7/2003 | Rao et al. | |
| 6,747,847 B2 | 6/2004 | Stoebe et al. | |
| 7,218,478 B2 | 5/2007 | Mate et al. | |
| 7,227,723 B2 | 6/2007 | Nath et al. | |
| 7,339,765 B2 | 3/2008 | Takagi | |
| 7,916,426 B2* | 3/2011 | Hu et al. | 360/236.1 |
| 7,940,497 B2* | 5/2011 | Kondo et al. | 360/235.7 |
| 2008/0024921 A1* | 1/2008 | Bolasna et al. | 360/234.3 |
| 2009/0059432 A1* | 3/2009 | Kubotera et al. | 360/236.6 |
| 2009/0109572 A1* | 4/2009 | Watanabe | 360/235.4 |

* cited by examiner

*Primary Examiner* — Angel A. Castro
(74) *Attorney, Agent, or Firm* — Patterson & Sheridan, LLP

(57) ABSTRACT

A slider for use with disk drive data storage devices includes a topography that defines features of the slider. The features facilitate in controlling fly-height and/or inhibiting lubricant accumulation on the slider. For example, a trailing air bearing surface of the slider may be formed around a multi-stepped channel that adjusts the fly-height. Further, a shallow shelf behind an air bearing surface and/or curved edges of the features to alter stagnation may contribute to at least inhibiting lubricant collection on the slider.

20 Claims, 4 Drawing Sheets

SLIDER WITH AN AIR BEARING SURFACE AND RELATED TOPOGRAPHY

BACKGROUND OF THE INVENTION

1. Field of the Invention

Embodiments of the invention generally relate to a slider within disk drive data storage devices.

2. Description of the Related Art

In an electronic data storage and retrieval system, a magnetic head typically includes a read/write transducer for retrieving and storing magnetically encoded information on a magnetic recording medium or disk. A suspended slider supports the magnetic head. In operation, the slider rides on a cushion or bearing of air above the surface of the disk as the disk is rotating at its operating speed. The slider includes an air bearing surface (ABS) designed to generate an air bearing force that counteracts a preload bias urging the slider toward the disk. The slider flies above and out of contact with the disk as a result of the ABS.

Problems with prior slider designs include lubricant pickup and inconsistent fly-height. Lubricant pickup occurs when lubricant coated on the disk collects on the slider. Once collected on the slider, the lubricant tends to interfere with the fly-height and result in poor magnetic interfacing between the slider and the disk.

With further regard to the fly-height, variations in the fly-height can occur based on what gas is in an environment surrounding the slider. Servo-writer functions take place in a helium atmosphere while subsequent use of the slider takes place in air. While desired to minimize the variations in the fly-height, undesirable higher flying of the slider in the helium relative to the air can degrade magnetic performance during the servo-writer functions.

Therefore, a need exists for sliders that improve performance of disk drive data storage devices.

SUMMARY OF THE INVENTION

For one embodiment, a slider for supporting a sensor element proximate to a movable data medium includes a leading air bearing surface (ABS) formed on a body and a trailing ABS formed on the body. A trench is disposed across the body and between the leading ABS and the trailing ABS. At least one channel is disposed in the body to have an opening into the trench and sidewalls that face one another and define a boundary of the trailing ABS, wherein a first portion of each channel extends to the opening into the trench, is less deep relative to the trailing ABS than the trench, and is deeper relative to the trailing ABS than a second portion of each channel.

According to one embodiment, a slider for supporting a sensor element proximate to a movable data medium includes a leading air bearing surface (ABS) formed on a body and a recessed shelf formed on the body and abutting a back-edge of the leading ABS. A trench formed across the body defines a back-edge of the recessed shelf and is deeper relative to the leading ABS than the recessed shelf. A trailing ABS is formed on the body and separated from the leading ABS by the shelf and the trench, wherein the back-edges of the leading ABS and the recessed shelf are shaped with curvatures that at least inhibit a line of stagnation in an area between the leading ABS and the trailing ABS.

In one embodiment, a hard disk drive data storage assembly includes a rotatable magnetic disk, an actuator arm extending across the disk, and a slider coupled to the actuator arm that maintains the slider in a movable operative relationship with the disk. A body of the slider forms a leading air bearing surface (ABS), a recessed shelf abutting a back-edge of the leading ABS, a trench defining a back-edge of the recessed shelf by being deeper relative to the leading ABS than the recessed shelf, wherein the back-edges of the leading ABS and the recessed shelf are curved. The body of the slider further forms a trailing ABS separated from the leading ABS by the shelf and the trench and a channel opening into the trench and having sidewalls that face one another and define a boundary of the trailing ABS, wherein a first portion of the channel extends to the opening into the trench, is less deep relative to the trailing ABS than the trench, and is deeper relative to the trailing ABS than a second portion of the channel.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Embodiments of the invention relate to topography of a slider for use with disk drive data storage devices. Features defined by the topography facilitate in controlling fly-height and/or inhibiting lubricant accumulation on the slider. For example, a trailing air bearing surface of the slider may be formed around a multi-stepped channel that adjusts the fly-height. Further, a shallow shelf behind an air bearing surface and/or curved edges of the features to alter stagnation may contribute to at least inhibiting lubricant collection on the slider.

Figure 1:
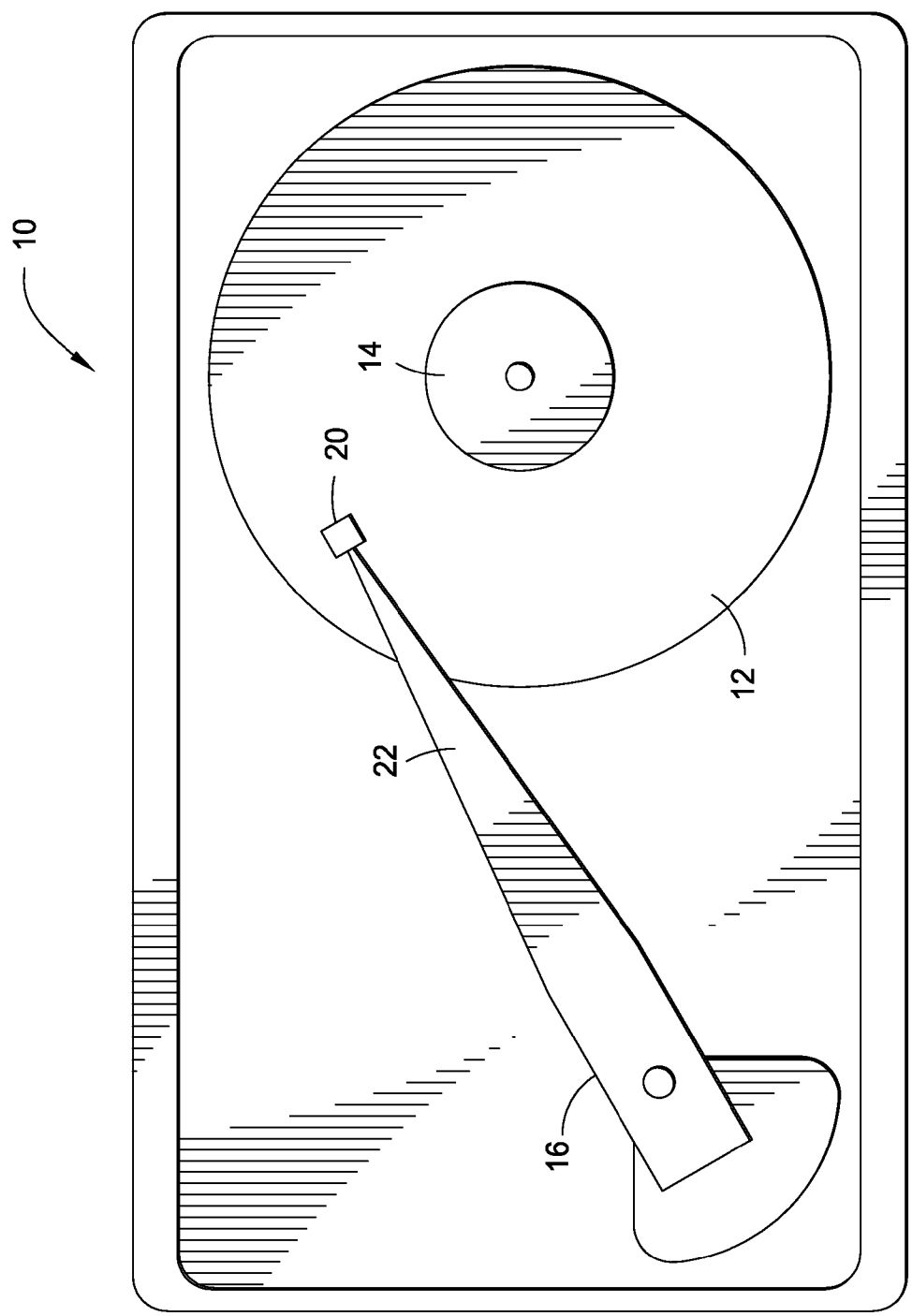
FIG. 1 is a top plan view of a hard disk drive including a slider, according to embodiments of the invention.

FIG. 1 illustrates a hard disk drive 10 that includes a magnetic media hard disk 12 mounted upon a motorized spindle 14. An actuator arm 16 is pivotally mounted within the hard disk drive 10 and movable relative to the disk 12. The actuator arm 16 includes a slider 20 disposed upon a distal end 22 of the actuator arm 16 that extends across the disk 12. During operation of the hard disk drive 10, the hard disk 12 rotates upon the spindle 14 and the slider 20 acts as an air bearing adapted for flying above the surface of the disk 12. The slider 20 includes a magnetic head for reading data from the disk 12 and/or writing data to the disk 12.

Figure 2:
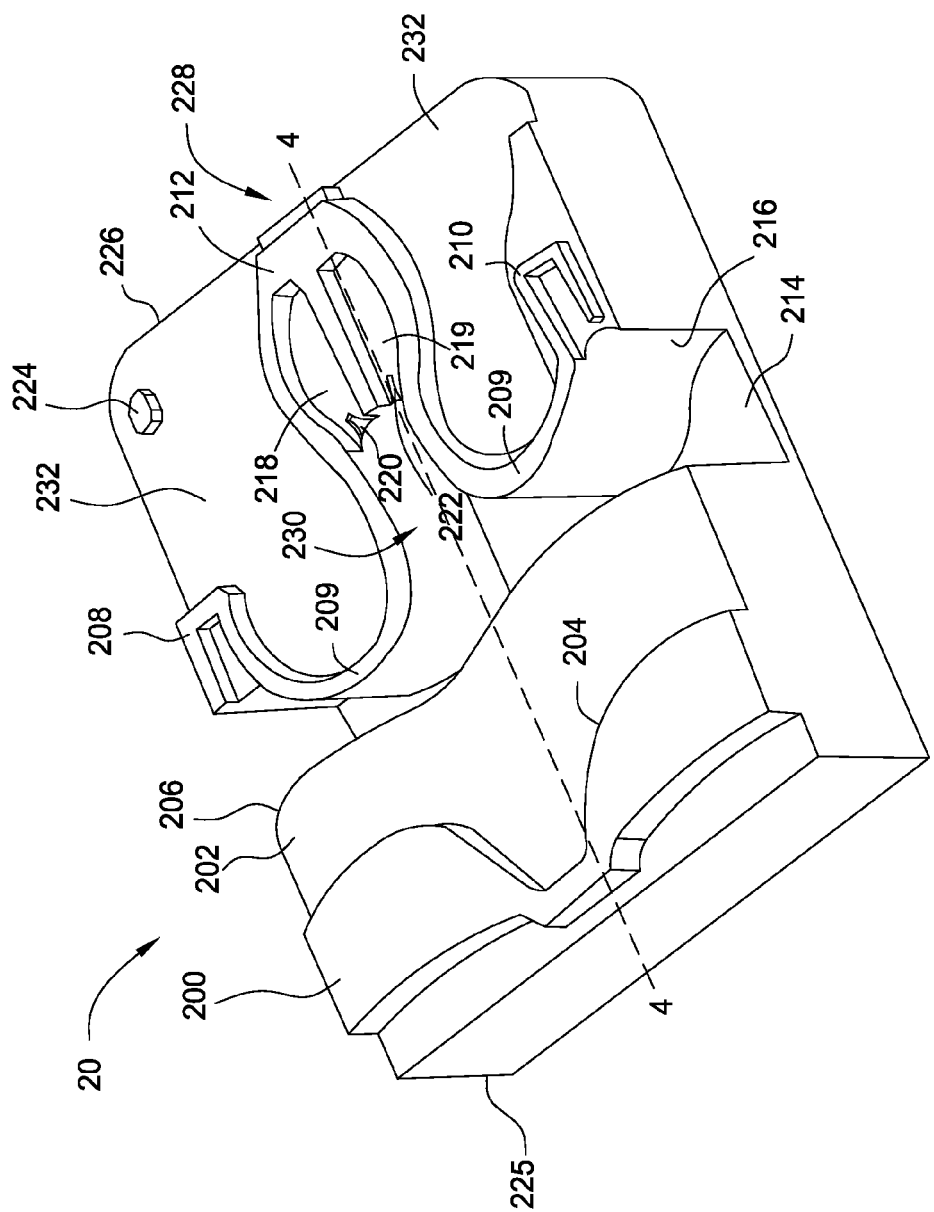
FIG. 2 is a bottom perspective view of the slider showing a disk facing surface of the slider, according to embodiments of the invention.
Figure 3:
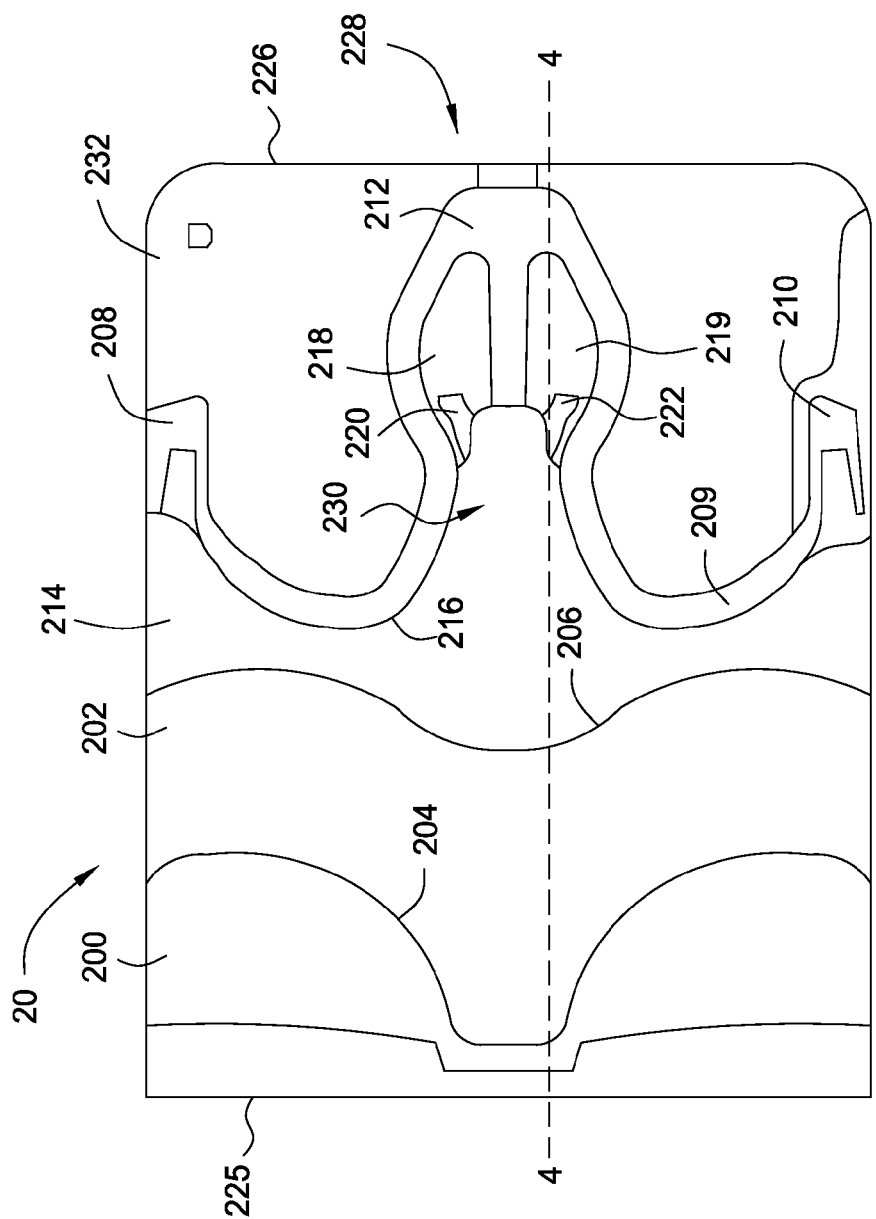
FIG. 3 is a bottom view of the slider, according to embodiments of the invention.

FIGS. 2 and 3 respectively illustrate a bottom perspective view and a bottom view of the slider 20 showing a disk facing surface of the slider 20 in one embodiment. The slider 20 defines a body with a leading end 225 and a trailing end 226. Rotating of the disk 12 (shown in FIG. 1) exposes the leading end 225 to air flow induced by this rotation. Direction of air inflow to outflow corresponds with the leading end 225 being disposed ahead of the trailing end 226 that is downstream of the leading end 225. In some embodiments, the magnetic head 228 further identifies the leading and trailing ends 225, 226 by being relatively closer to the trailing end 226 than the leading end 225. A roll direction is defined perpendicular across the slider 200 relative to a pitch direction (i.e., corresponding to line 4-4) from the leading end 225 to the trailing end 226 defines.

From the leading end 225 toward the trailing end 226, the slider 20 includes a leading air bearing surface (ABS) 200, a recessed shelf 202, and a trench 214. The slider 20 further includes a first side ABS 208, a second side ABS 210, a trailing ABS 212, and a negative pressure recessed region 232 that are all disposed toward the trailing end 226 of the slider 200 from the trench 214. The leading ABS 200, the first side ABS 208, the second side ABS 210, and the trailing ABS 212 provide a coplanar ABS reference from which depth of recessed regions of the slider 20 are gauged. Any ABS described herein may generate an air bearing force during flying of the slider 20. Negative pressure generated in the recessed region 232 provides part of opposing force to the air bearing force. A landing pad 224 within the recessed region 232 extends less than an ABS from the recessed region 232 in order to provide a less rough contact surface than that surrounding the landing pad 224 should this area of the slider 20 contact with the disk.

The first side ABS 208 is spaced in the roll direction from the second side ABS 210. The trailing ABS 212 occupies a central region of the slider 20 in the roll direction. An ABS interconnecting wall 209 may connect without any depth variation the first side ABS 208 to the trailing ABS 212 and the second side ABS 210 to the trailing ABS 212.

The leading ABS 200 extends across the slider 20 in the roll direction. Size of the leading ABS 200 in the pitch direction varies across the roll direction with the size narrowing in a middle of the leading ABS 200. This creates larger areas of the leading ABS 200 spaced in the roll direction from one another by the middle of the leading ABS 200. For some embodiments, the leading ABS 200 may extend in a discontinuous manner across the slider 20 in the roll direction, such as if the middle of the leading ABS 200 is not present.

The recessed shelf 202 abuts a back-edge 204 of the leading ABS 200 creating a step at the back-edge 204 of the leading ABS 200. The shelf 202 at least inhibits lubricant accumulation behind the leading ABS 200. Strength of a vacuum created behind the leading ABS 200 can influence tendency to have lubricant accumulation at this location. Amount of pressure drop following the leading ABS 200 decreases as depth of the shelf 202 decreases.

Figure 4:
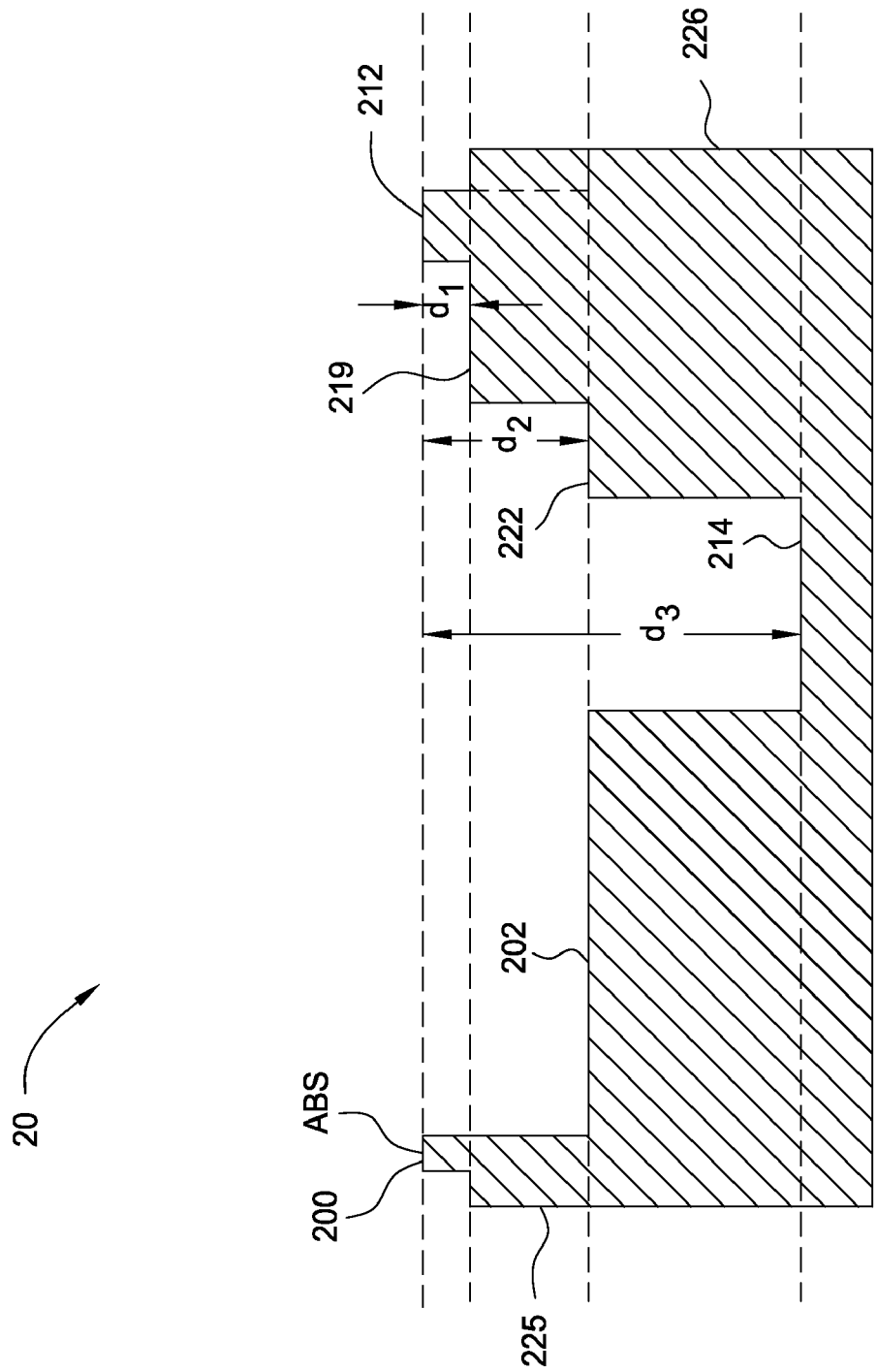
FIG. 4 is a cross-sectional view of the slider taken across line 4-4 of FIGS. 2 and 3, according to embodiments of the invention.

FIG. 4 shows a cross-sectional view of the slider 20 taken across line 4-4 of FIGS. 2 and 3 in order to illustrate such depth changes in topography of the slider 20. The shelf 202 is recessed a second depth ($d_2$) relative to the ABS reference. In some embodiments, the second depth is less than 2.0 micron (e.g., about 0.57 microns). A distance of 5.0 microns to 300 microns may separate the back-edge 204 of the leading ABS 200 from a back-edge 206 of the shelf 202. A step transition between the shelf 202 and the trench 214 defines the back-edge 206 of the shelf 202.

Stagnation of air flow facilitates lubricant accumulation on the slider 20 since there is no flushing action when velocity of the air flow goes to zero. To mitigate stagnation, one or both of the back-edges 204, 206 of the leading ABS 200 and the recessed shelf 202 curve in profile across the roll direction. Since curved shapes result in only discrete points of stagnation, this curvature at least inhibits a line of stagnation in an area between the leading ABS 200 and the trailing ABS 212. In some embodiments, one or both of the back-edges 204, 206 may lack any straight sections across the slider 20 in the roll direction.

The trench 214 extends across the slider 20 in the roll direction and is disposed between the shelf 202 and the trailing ABS 212 such that the leading ABS 200 and the trailing ABS 212 are separated by the shelf 202 and the trench 214. The trench 214 has a third depth ($d_3$) that is greater than the second depth and that is sufficient such that air is at atmospheric pressure in the trench 214 during operation of the slider 20. For example, the third depth may be about 4.0 microns. A center extension 230 of the trench 214 aligns with the trailing ABS 212 and extends further toward the trailing end 226 than adjacent portions of the trench 214. The center extension 230 holds air for supply to the trailing ABS 212.

A back-edge 216 of the trench 214 may also define a curved profile across the roll direction of the slider 20 to further inhibit forming lines of stagnation in the area between the leading ABS 200 and the trailing ABS 212. The trench 214 is defined between a step creating the back-edge 216 of the trench 214 and the back-edge 206 of the shelf 202. Transition from the interconnecting wall 209 to the trench 214 may form part of the back-edge 216 of the trench 214.

In some embodiments, the trailing ABS 212 forms a general "ω" shape (lowercase omega) when viewed from the bottom side of the slider 20 that faces the disk. To form this shape, a first channel 218 and a second channel 219 are surrounded by the trailing ABS 212 except where the channels 218, 219 open into the central extension 230 of the trench 214. Further, the channels 218, 219 extend along the pitch direction with a central part of the trailing ABS 212 disposed between at least portions of the channels 218, 219. The channels 218, 219 thus each have sidewalls that face one another and define a boundary of the trailing ABS 212. A first trough 220 forms a portion of the first channel 218 and extends to the trench 214. The first trough 220 is less deep relative to the trailing ABS 212 than the trench 214, and is deeper relative to the trailing ABS 212 than adjacent portions of the first channel 218. The second channel 219 includes a second trough 222 having a similar arrangement as the first trough 220 with respect to the first channel 218. For some embodiments, only one of the channels 218, 219 may be present.

Compared to an arrangement without the troughs 220, 222, the channels 218, 219 with respective ones of the troughs 220, 222 reduce fly-height of the slider 20 when in helium such that there is less atmosphere dependent variation in the fly-height. Further, the troughs 220, 222 can balance the fly-height from inner diameter to outer diameter (i.e., in the roll direction with the first trough 220 corresponding to the inner diameter and the second trough corresponding to the outer diameter). Variables such as length and angles of the troughs 220, 222 enable control of peak pressure ahead of the trailing ABS 212 during operation. Further, the troughs 220, 222 balance a thermal fly-height control (TFC) compensation ratio from the inner diameter to the outer diameter. The TFC functions by heating the magnetic head 228 and/or portions of the trailing ABS 212 to cause thermal expansion that makes the magnetic head 228 protrude. When the magnetic head 228 protrudes, air pressure under the slider 20 increases causing the fly-height to increase and negate some fractional amount of this protrusion. This fractional amount defines the compensation ratio, which is not constant from the inner diameter to the outer diameter without the troughs 220, 222.

In some embodiments, the first and second troughs 220, 222 have different dimensions and/or angles relative to the pitch direction. For example, the first trough 220 may be shorter in length than the second trough 222. Configuration of the troughs 220, 222 can compensate for inner diameter air flow being lower than outer diameter air flow and air flow entry angles for the inner diameter air flow being different than the outer diameter air flow. Angle of the troughs 220, 222 may align with incoming air flow. As the depth and/or length of the troughs 220, 222 increase, the fly-height raises. For some embodiments, the troughs 220, 222 have a deepness that is the second depth ($d_2$) and is less than 2.0 micron. While the shelf 202 and the troughs 220, 222 may have different depths, utilizing the second depth for both may reduce etching steps. The remainder of the channels 218, 219 outside of the troughs 220, 222 may be at a first depth ($d_1$) less than the second depth. For example, the first depth may be about 0.12 microns. The length of the troughs 220, 222 may be between 5 and 200 microns. Angles of the troughs 220, 222 relative to the pitch direction may range from 0° to 45° and 0° to −45°.

Conventional mask and etching techniques can create the slider 20, according to one embodiment. For example, shallow ion milling can remove material at locations identified by the first depth while the second depth may be achieved by deep ion milling. Reactive ion etching at the trench 214 can produce the third depth.

While the foregoing is directed to embodiments of the present invention, other and further embodiments of the invention may be devised without departing from the basic scope thereof, and the scope thereof is determined by the claims that follow.

What is claimed is:

1. A slider for supporting a sensor element proximate to a movable data medium, comprising:
    a leading air bearing surface (ABS) formed on a body;
    a trailing ABS formed on the body;
    a trench disposed across the body and between the leading ABS and the trailing ABS; and
    at least one channel disposed in the body to have an opening into the trench and sidewalls that face one another and define a boundary of the trailing ABS, wherein a first portion of each channel extends to the opening into the trench, is less deep relative to the trailing ABS than the trench, and is deeper relative to the trailing ABS than a second portion of each channel.

2. The slider of claim 1, further comprising a recessed shelf formed on the body and abutting the leading ABS, wherein back-edges of the leading ABS and the recessed shelf are shaped with curvatures that at least inhibit a line of stagnation in an area between the leading ABS and the trailing ABS.

3. The slider of claim 1, wherein the first portion of the channel has a depth of less than 2.0 micron relative to the trailing ABS.

4. The slider of claim 1, wherein the trailing ABS forms a ω-shape.

5. The slider of claim 1, wherein the at least one channel includes a first channel and a second channel separated by a central part of the trailing ABS.

6. The slider of claim 5, wherein the first portion of the first channel is longer than the first portion of the second channel.

7. The slider of claim 5, wherein the first portion of the first channel is angled differently relative to a longitudinal axis of the slider than the first portion of the second channel.

8. The slider of claim 1, wherein a center extension of the trench aligns with the trailing ABS and extends further toward an end of the body with the trailing ABS than adjacent portions of the trench.

9. The slider of claim 1, wherein an interconnecting wall connects without any depth variation a first side ABS to the trailing ABS and a second side ABS to the trailing ABS.

10. The slider of claim 9, wherein transition between the interconnecting wall and the trench forms part of a curved back-edge of the trench.

11. The slider of claim 1, further comprising a magnetic transducer head disposed on the body.

12. A slider for supporting a sensor element proximate to a movable data medium, comprising:
    a leading air bearing surface (ABS) formed on a body;
    a recessed shelf formed on the body and abutting a back-edge of the leading ABS;
    a trench formed across the body, wherein the trench defines a back-edge of the recessed shelf and is deeper relative to the leading ABS than the recessed shelf; and
    a trailing ABS formed on the body and separated from the leading ABS by the shelf and the trench, wherein the back-edges of the leading ABS and the recessed shelf are shaped with curvatures that at least inhibit a line of stagnation in an area between the leading ABS and the trailing ABS.

13. The slider of claim 12, further comprising at least one channel disposed in the body to each have an opening into the trench and sidewalls that face one another and define a boundary of the trailing ABS, wherein a first portion of each channel extends to the opening into the trench, is less deep relative to the trailing ABS than the trench, and is deeper relative to the trailing ABS than a second portion of each channel.

14. The slider of claim 12, wherein depth of the recessed shelf relative to the leading ABS is less than 2.0 micron.

15. The slider of claim 12, wherein depth of the recessed shelf relative to the leading ABS is less than 2.0 micron and the trench extends from the recessed shelf to the trailing ABS.

16. The slider of claim 12, wherein a back-edge of the trench has a curved shape.

17. The slider of claim 12, wherein an interconnecting wall connects without any depth variation a first side ABS to the trailing ABS and a second side ABS to the trailing ABS.

18. The slider of claim 17, wherein transition between the interconnecting wall and the trench forms part of a curved back-edge of the trench.

19. A hard disk drive data storage assembly, comprising:
    a rotatable magnetic disk;
    an actuator arm extending across the disk; and
    a slider coupled to the actuator arm that maintains the slider in a movable operative relationship with the disk, wherein a body of the slider forms:
        a leading air bearing surface (ABS);
        a recessed shelf abutting a back-edge of the leading ABS;
        a trench defining a back-edge of the recessed shelf by being deeper relative to the leading ABS than the recessed shelf, wherein the back-edges of the leading ABS and the recessed shelf are curved;

a trailing ABS separated from the leading ABS by the shelf and the trench; and a channel opening into the trench and having sidewalls that face one another and define a boundary of the trailing ABS, wherein a first portion of the channel extends to the opening into the trench, is less deep relative to the trailing ABS than the trench, and is deeper relative to the trailing ABS than a second portion of the channel.

20. The assembly of claim 19, wherein the trailing ABS forms a ω-shape.

* * * * *